US011058223B2

(12) United States Patent
de la Fuente Sanchez et al.

(10) Patent No.: US 11,058,223 B2
(45) Date of Patent: *Jul. 13, 2021

(54) METHOD AND APPARATUS TO KEEP TRACK OF PERFORMANCE DATA AND USER'S PREFERENCES WHILE USING A STANDING DESK AND FITNESS DEVICES

(71) Applicant: INVENTU RESEARCH INC., Victoria (CA)

(72) Inventors: Alfonso Fabian de la Fuente Sanchez, Victoria (CA); Fabian de la Fuente Olivas, Victoria (CA); Alfonso de la Fuente Deveze, Tijuana (MX)

(73) Assignee: INVENTU RESEARCH INC., British (CA)

( * ) Notice: Subject to any disclaimer, the term of this patent is extended or adjusted under 35 U.S.C. 154(b) by 107 days.

This patent is subject to a terminal disclaimer.

(21) Appl. No.: 16/104,889

(22) Filed: Aug. 18, 2018

(65) Prior Publication Data
US 2020/0054136 A1 Feb. 20, 2020

Related U.S. Application Data

(60) Provisional application No. 62/548,392, filed on Aug. 21, 2017.

(51) Int. Cl.
  A47B 21/02    (2006.01)
  A47B 97/00    (2006.01)
  A63B 69/16    (2006.01)
  A63B 24/00    (2006.01)
  A63B 22/06    (2006.01)
(Continued)

(52) U.S. Cl.
CPC .......... *A47B 97/00* (2013.01); *A63B 22/0605* (2013.01); *A63B 24/0062* (2013.01); *A63B 69/16* (2013.01); *G06F 1/3231* (2013.01); *G06F 21/31* (2013.01); *H04W 4/80* (2018.02); *A47B 2200/0062* (2013.01);
(Continued)

(58) Field of Classification Search
None
See application file for complete search history.

(56) References Cited

U.S. PATENT DOCUMENTS 6,283,896 B1 * 9/2001 Grunfeld ................ G16H 40/67
                                                   482/54
9,486,070 B2 * 11/2016 Labrosse ................... A47B 9/20
(Continued)

*Primary Examiner* — Sunit Pandya
(74) *Attorney, Agent, or Firm* — Finch & Maloney, PLLC; Michael J. Bujold

(57) ABSTRACT

A network of devices that include Workspace Fitness Devices, such as Smart Under-the-desk Bikes and Smart Desk Controllers embedded in Smart Sit-and-Stand Desks that connect or "talk" to one another, electronically identify individual users, track their activities, connect to a remote server database, and modify its records. Secondary devices such as smartphones, can connect to this network to remotely monitor and control the settings on the devices such as the desk's height or the required tension in the Smart Under-the-Desk Bike. The performance data captured by this network of devices can be shared to fitness tracking software or devices. By using our invention, we plan to motivate employees that sit behind the desk for numerous hours throughout the day to improve their health, productivity, and overall wellbeing.

15 Claims, 12 Drawing Sheets

(51) Int. Cl.
*H04W 4/80* (2018.01)
*G06F 1/3231* (2019.01)
*G06F 21/31* (2013.01)

(52) U.S. Cl.
CPC ............... *A47B 2200/0081* (2013.01); *A47B 2200/0082* (2013.01); *A63B 2022/0641* (2013.01); *A63B 2225/50* (2013.01)

(56) References Cited

U.S. PATENT DOCUMENTS

| | | | |
|---|---|---|---|
| 9,757,611 B1* | 9/2017 | Colburn | A63B 22/0694 |
| 9,901,780 B2* | 2/2018 | DeLuca | A63B 22/0242 |
| 9,916,537 B2* | 3/2018 | Riquelme Ruiz | A47B 95/00 |
| 9,999,971 B2* | 6/2018 | Charlton | B25H 1/02 |
| 10,130,168 B2* | 11/2018 | Lee | A47B 37/00 |
| 10,130,169 B1* | 11/2018 | Labrosse | G05B 19/048 |
| 10,376,736 B2* | 8/2019 | Powell | H02K 7/1008 |
| 10,405,647 B2* | 9/2019 | Laudadio | A47B 21/04 |
| 10,568,418 B2* | 2/2020 | Applegate | A47B 3/12 |
| 2007/0093360 A1* | 4/2007 | Neff | A63B 21/008 |
| | | | 482/8 |
| 2014/0187383 A1* | 7/2014 | Martin | A63B 22/02 |
| | | | 482/8 |
| 2016/0260019 A1* | 9/2016 | Riquelme Ruiz | A47B 9/00 |
| 2017/0050308 A1* | 2/2017 | Charlton | B25H 1/10 |
| 2017/0052517 A1* | 2/2017 | Tsai | A47B 9/00 |
| 2019/0328128 A1* | 10/2019 | Namala | A47B 9/16 |
| 2019/0328129 A1* | 10/2019 | Namala | A47B 9/16 |

* cited by examiner

METHOD AND APPARATUS TO KEEP TRACK OF PERFORMANCE DATA AND USER'S PREFERENCES WHILE USING A STANDING DESK AND FITNESS DEVICES

CROSS-REFERENCE TO RELATED APPLICATIONS

This application claims priority to U.S. Provisional Patent Application Ser. No. 62/548,392, filed on Aug. 21, 2017.

BACKGROUND

The tasks performed in a desk, be it an office, home, or school desk, have changed over the years. Office desks in the middle of the past century tended to be heavy as they needed to support heavy typewriters. Additionally, desks in a work office were in open areas where users didn't want people to move their desks away. Some were even made of metal or heavy materials.

In its earlier years, the office desk evolved from supporting typewriters to CRT monitors and a computer keyboard. Soon, CRT monitors were also replaced by newer computers with a mouse, a keyboard, and a lightweight LCD monitor (or a pair of LCD monitors) connected to a CPU or a laptop.

In essence, office desks have remained the same over time. Today, most desks are still comprised of legs and a flat desktop surface resting at a height of approximately 30", allowing the user to sit comfortably in a chair while performing their tasks.

There are studies that claim people who work on a desk for more than 8 continuous hours must stand up from time to time. It has also been claimed that certain people experience better thought processing and focus while standing as opposed to sitting.

A newer type of desk that was previously only suitable to architects and graphic designers is making its way to offices, these are the height-adjustable desks commonly known as "Sit-and-Stand Desks". Some have a manual crank to adjust the height, others have an electric motor—the latter using a controller. Basic controllers only turn the motor up and down, whereas some more advanced controllers can sense the height of the desk, have programmable memory, and have integrated timers to alert the user when it is time to stand up and continue their work.

New Sit-and-Stand Desks usually have a pair of legs and must be connected to the electricity in order to provide power to the motors that adjust the desk's height.

Most tabletops are made of solid material, thus, the furniture manufacturers need to connect all cables, motors, and connectors below the table top.

Normally, the electrical cable that connects the tabletop, the legs, and the motor, runs from somewhere within the tabletop.

Users want to connect their monitors or dual monitors to the Sit-and-Stand Desk.

Electric motor-driven Sit-and-Stand Desks require a controller to control the up and down functions. Some controllers are even calibrated to provide visual feedback through a display with the approximate height of the desk at the current position and have memory settings where the user can program at which height he/she prefers to use that desk. Employers and/or users of these types of desks are concerned about the personal health issues of seating for long periods of time.

In the case of offices, a desk is typically used by a single user; however, other workspaces may be occupied by desks that don't have a single user, but rather multiple ones. That is the case of shared spaces in offices or school classrooms.

Electric Sit-and-Stand Desks need an AC input. Desks usually hold a monitor and/or a CPU in the form of a desktop, laptop, or tablet. Such devices require energy to work or recharge the device. Users like to store their smart gadgets such as tablets, cell-phones, or other devices in their drawers. Such devices require power to be recharged. What all workspaces have in common is that they need tabletops for users to work on.

Desks are heavy, some weight more than 100 kgs. Old desks, made of metal are heavy. They were created for an age where heavy typewriters sat on top of those desks. Some even had glass covers. Newer desks and workstations are planned for the 20th century with some space for a CRT monitor and a newer computer.

Some newer versions of those desk have special mountings for LCD monitors and connectivity for laptops.

Fitness stationary bikes are capable to capture the energy generated by pedaling (such as dynamo) have been around for many years.

IOT Fitness Devices (IOT-FD) such as standing bikes are available at several big-end fitness centers around the globe. These devices are able to transmit captured data when a workout takes place. There are different methods for the IOT-FD to capture the ID of the person using the device, such methods include RF identification, bar code reading, and security authorization (i.e. manual input of the login credentials of the user).

The inventions described in this patent application are related to workspace fitness as a concept to live healthier lives in the corporate office environment by introducing different components that have a common device—the office desk—that is used by office workers all over the world. The concept of this new office desk is a sit and stand desk that elevates using electronic motors. Such motors are controlled by a central smart desk controller of our invention, which wirelessly connects to smart devices and wearables as well as to other connected peripherals of our invention.

References to the smart desk controller are the same as the intelligent controller or intelligent desk controller.

The Workspace Fitness Devices (WFDs) described here are different from a smart gym device because in a gym, a user goes to the device, identifies himself, and the device keeps track of his performance via the user's device or the connectivity via the LAN to the remote server. In the case of the Workspace Fitness Devices, the device moves to the user's workspace and the user is identified at the smart desk controller. The smart desk controller then identifies the user's selected Workspace Fitness Device by identifying the device itself. It is possible for the device not to communicate to the remote server by itself, only via the smart desk controller or the user's smart device (smartphone, smartwatch). Since the desk where the smart desk controller is installed may not be the same desk for the same person every day, the smart desk controller needs to identify the user in order to tie up that individual's performance when using the WFDs.

SUMMARY

A network of devices that include Workspace Fitness Devices, such as Smart Under-the-desk Bikes and Smart Desk Controllers embedded in Smart Sit-and-Stand Desks that connect or "talk" to one another, electronically identify individual users, track their activities, connect to a remote server database and modify its records. Secondary devices, such as smartphones, can connect to this network to remotely monitor and control the settings on the devices such as the desk's height or the required tension in the Smart Under-the-Desk Bike. The performance data captured by this network of devices can be shared to fitness tracking software or devices. By using our invention, we plan to motivate employees that sit behind the desk for numerous hours throughout the day to improve their health, productivity, and overall wellbeing.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of figures, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and a network of devices that include Workspace Fitness Devices, such as Smart Under-the-desk Bikes and Smart Desk Controllers embedded in Smart Sit-and-Stand Desks that connect or "talk" to one another, electronically identify individual users, track their activities, connect to a remote server database and modify its records. Secondary devices, such as smartphones, can connect to this network and remotely monitor and control the settings on the devices such as the desk's height or the required tension in the Smart Under-the-desk Bike. The performance data captured by this network of devices can be shared to fitness tracking software or devices. By using our invention, we plan to motivate employees that sit behind the desk for many hours a day to improve their health, performance and overall wellbeing.

Figure 1:
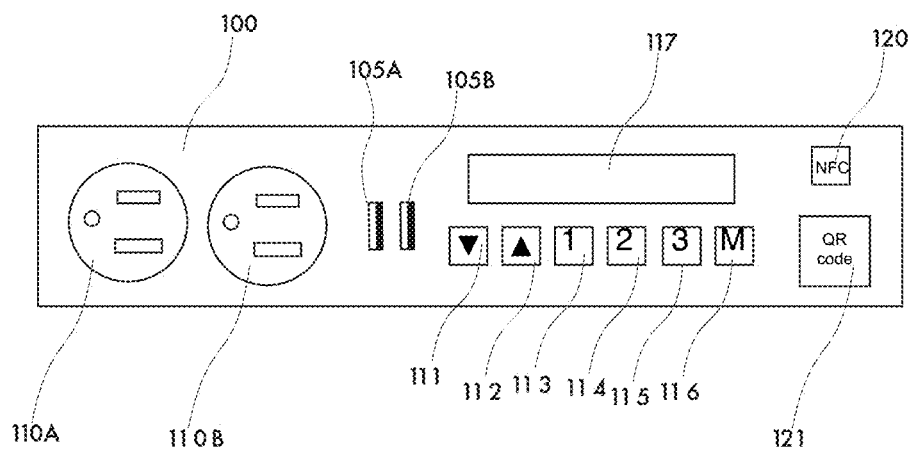
FIG. 1 is a front elevation view of a Smart Desk Controller.
Figure 2:
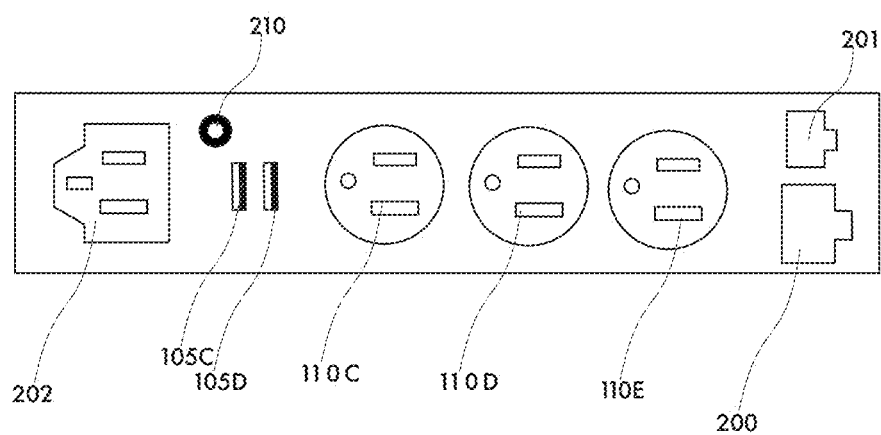
FIG. 2 is a rear elevation view of the Smart Desk Controller of FIG. 1.
Figure 3:
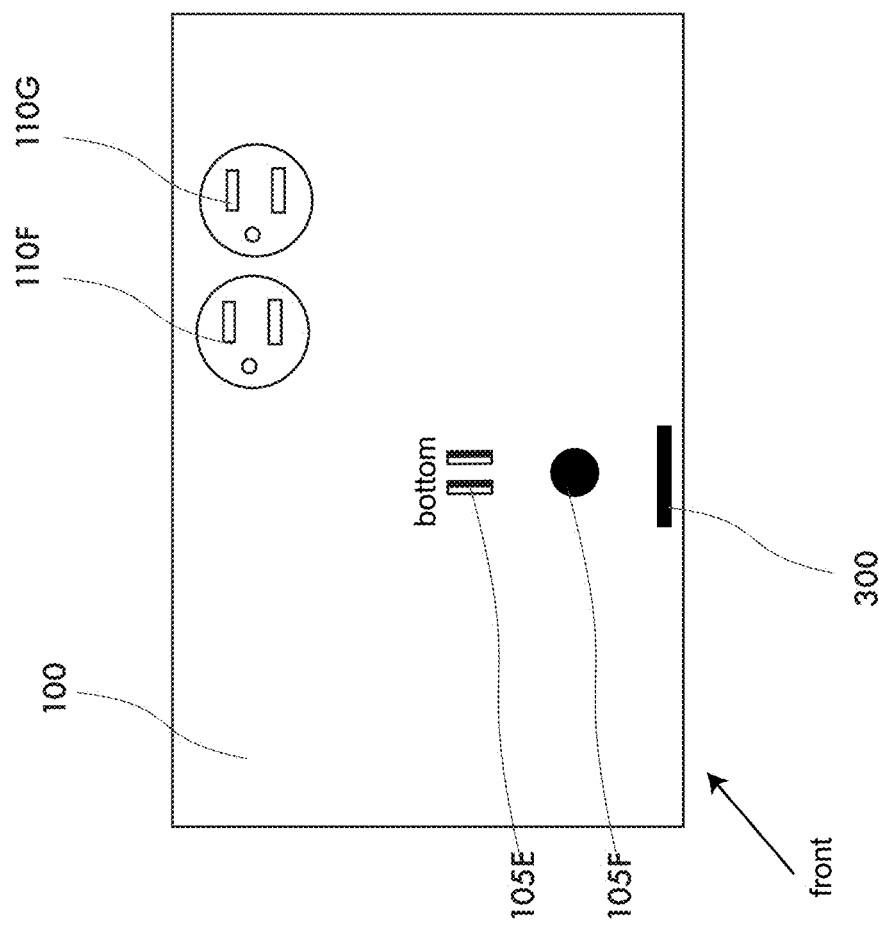
FIG. 3 is bottom plan view of the Smart Desk Controller of FIG. 1.

FIGS. 1 to 3 describe the first part of our invention, a Smart Desk Controller that embeds in a desktop with an optional built-in AC/DC distribution hub. Most commonly used in a height-adjustable desk, the controller of our invention replaces the common keyboard or controller that operates the height adjustment motors in the height-adjustable desk. The Smart Desk Controller apparatus embeds or installs inside the desktop itself, the Smart Desk Controller is not exposed on the top of the desktop. In a different embodiment of our invention, the Smart Desk Controller may be exposed on the outside or the sides of the desktop.

FIG. 1 shows the Smart Desk Controller of our invention, it uses an integrated distribution hub that allows for remote control of the distribution of the energy of the foreign devices that are connected to the desk, such foreign devices can be described as monitors, computers, lamps, or cell phone chargers. By concentrating all of the AC and DC connections on the underside of a height-adjustable tabletop or desktop it minimizes and organizes the amount of cables that need to pass underneath the tabletop by providing an all-in-one intelligent Sit-and-Stand Desk controller, or Smart Desk Controller, that has the following features:

A way to identify the user, by using a QR code, an NFC tag, a radio proximity sensor such as a Bluetooth or similar connection. The Smart Desk Controller of our invention that also has a power management distribution, including input and output ports for AC and DC strategically placed to better fit in a tabletop and to provide easy access for the user to such power. A working switchable light to illuminate the desk drawer immediately below where the intelligent desk controller is located. A way to communicate with other devices through a wired or wireless network in order to connect to the internet and through RF to communicate with other Smart Desk Controllers, IOT devices or Workspace Fitness Devices such as an intelligent desk chair, a stand, or a smart under-the-desk bike, as well to other Workspace Fitness Devices such as a smart-stepper, a smart-yoga-ball or a smart-balance-board.

The NFC or Near Field Communication is a radio communication protocol in which, on one end, a device has an NFC tag and a second device has an NFC reader. The NFC tag could be passive or active. Passive NFC tags can take the form of keyless cards that are used to open offices—which only require someone to tap. The energy to power the electronics in the NFC tag comes from the electromagnetic field generated by the NFC reader. An Active NFC tag, is for example, one generated by a device such as a cellphone, which can generate a string of RF signals to emulate an NFC tag with an ID number on command.

Bluetooth is another protocol used by two devices with RX/TX capabilities that use a frequency, low power radio signal to communicate two or more devices (pair) which transmit data between both devices.

Identification by QR code is a process under which, the Smart Desk Controller has a physical visible QR code printed on the Smart Desk Controller itself or placed in the Smart Sit-and-Stand Desk where the Smart Desk Controller is installed. By using a specific software in a smart gadget such as a tablet or cellphone, a user can open the app in the cell phone, open the camera, and take a photo of the QR code. The QR code may contain information pertaining to a website to open, a URL to follow or a serial number to be encoded, which, in combination with a database—such as the one that runs on the remote server for the workspace Fitness database—correlates the information regarding the user name, or owner of the cellphone and the registered user in the database against the serial number of the Smart Sit-and-Stand Desk related to the serial number encoded on the QR code.

Other means of identification include the use of a printed serial number or code, under which, the user can input that information into the cell phone app and request the Smart Desk Controller to identify him/her as the user of that particular Smart Sit-and-Stand Desk.

The Smart Desk Controller of our invention also features proximity sensors that detect the presence of a person or objects such as a Workspace Fitness Device.

In a different embodiment of our invention, the Smart Desk Controller has a built in keypad on the side of the tabletop with a CPU that controls all of the e-features. The Smart Desk Controller can read NFC tags or information coming from NFC tag generators such as smartphones.

FIG. 1 shows the front view of a Smart Desk Controller (100) that includes one or more AC outlets (110A, 110B), one or more USB connectors (105A, 105B), a keyboard to control the required height of the Smart Sit-and-Stand Desk, the keyboard consisting for example of buttons to position the desk down (111) or up (112), one or more memory buttons (113, 114, 115, 116) where a user can record a position the user wants and manually override the requested heights set by using the smart gadget to set the height of the standup desk. A QR code (121) and an NFC and RFID reader (120) both used for identification of the user of the Smart Sit-and-Stand Desk. In a different embodiment of our invention, the Smart Desk Controller rescinds the use of a power distribution hub and acts as all the other features of a Smart Desk Controller.

One familiar with the art will appreciate that the keyboard or buttons could be a detached external keyboard. One also familiar with the art can appreciate that the keyboard can be one from the group of a capacitive keyboard.

A case scenario will be explained to demonstrate one of the uses of our invention. This example does not limit the proposed uses of our invention. A user comes in to a desk, it can be his assigned desk or an unassigned desk, the user taps his/her phone to the Smart Desk Controller, it identifies him/her by reading the NFC tag and communication thru the network to the remote server, confirming in the database the name and preference settings for the Smart Sit and Stand Desk. Such preferences may include (for example) the desired times for different desired positions. For example, at 10 am, the user wants the Smart Sit-and-Stand Desk to be in the stand position for 1 hour and then, automatically come back down after the specified timeframe.

FIG. 2 shows a back-view of the Smart Desk Controller, which includes one or more AC outlets (110C, 110D, 110E), one or more USB connectors (105C, 105D), a DC power in connector (not shown), an AC power in connector (202), a wireless LAN connector (200) a universal connector (201) and an external antenna connector (210) where one can install an optional external antenna (not shown).

FIG. 3 is a bottom view of the Smart Desk Controller

One familiar with the art will appreciate that the bottom part can be exposed as part of the Smart Desk Controller into the Desktop embedding process, which is supported by the top of the controller attached to the bottom of the desktop. The Smart Desk Controller (100) bottom that includes one or more AC outlets (110F, 110G), one or more USB ports (105E) a sensor or light aperture (301) and a remote-controlled locking mechanism.

FIGS. 1 to 5 describe one form of our invention, the Smart Sit-and-Stand Desk, which comprises of a desktop that sits on at least two telescopic, or height adjustable legs with a motor that drives the legs up and down and a Smart Desk Controller with or without a power distribution hub. In a different embodiment of our invention, the Smart Sit-and-Stand Desk has integrated controls with IOT (Internet of Things) capabilities.

FIGS. 1 to 5 also describe another form of our invention while using an ergonomic desktop, which features a light-weight honeycomb tabletop that rests on top of the electric driven legs. The tabletop has an embedded or integrated Smart Desk Controller with buttons on the side of the tabletop. In a different embodiment of our invention, the buttons are part to an external keyboard that is facing out on a side of the desktop. In a different embodiment of our invention, the keyboard is a capacitive keyboard that can be concealed inside the tabletop itself. In a different embodiment of our invention, the embedded Smart Desk Controller is installed in the ergonomic tabletop in such a way that the built-in buttons or keyboard are in a side of the Smart Desk Controller that is facing out by the side or the top of the desktop.

The ergonomic desktop bottom has embedded open trails that can carry the electrical and data cables that run internally and exit through one of the legs or through their designated entry and exit areas. In a different embodiment of our invention, the Smart Desk Controller that has built-in AC outlets with digital wattage meters that run locally and can act as IOT devices to connect to a remote server or device, together, with a power management software app a user can retrieve power use information or control the delivery of power thru those outlets. In a different embodiment of our invention, the controller also has a built in DC converter with a USB connector for powering smart devices.

The Smart Sit-and-Stand Desk of our invention can be used in the office, cubicle, or the home office.

The Smart Sit-and-Stand Desk of our invention has an ergonomic tabletop design that optimizes space for the 21st century tasks. When our Smart Sit-and-Stand desk is used in the stand or sit position, the optimal height for tabletop is co-related to the height of a person's elbows. In the same correlation, the height of the eyes of the user need to be horizontal to the top of the monitor display. Such correlation needs to be maintained regardless if the Smart Sit-and-Stand Desk is in the sit or stand position, although the heights vary, as when a person is standing up, the height distance between the tabletop and the monitor height is different. In a different embodiment of our invention, the monitor elevation system is a separate mechanical system that match the height of the monitor display once the desk is standing and when the desk is in the seat position adjusts the monitor height to the preset height.

In a different embodiment of our invention, the Smart Sit-and-Stand Desk includes an optional desk drawer with the following features: made from lightweight material, USB connector or port inside the desk drawer to provide power charging to a smart gadget device, a USB extension from the charging drawer in case the user wants to connect the phone to the workstation. A Tampering sensor that could trigger alarms in the Smart Desk Controller or send information via their IOT connectivity to other smart gadgets. Our Smart Sit and Stand Desk also includes a remotely-controlled electronic lock (can be unlocked by the phone app) and a height sensor attached to the bottom of the drawers to prevent accidents when lowering the desk.

AC in and out of the leg's base to create a chain of connections when using the desk in open spaces such as school classrooms or large open work areas. In a different embodiment of our invention, the drawers can only open if the smart device is present, detected by the Smart Desk Controller, or if the user overrides them via a connection on a website. It also has a built in presence sensor that senses when someone is near or seated at the desk, or while using the desk if a user is using a Workspace Fitness Device such as an under-the-desk bike (as an example). In a different embodiment of our invention, the first top drawer is a slim one for the smart gadget.

In a different embodiment of our invention, the height-adjusting crank and axles of the Smart Sit-and-Stand Desk are completely covered to avoid malfunction by tampering or dust.

Figure 4:
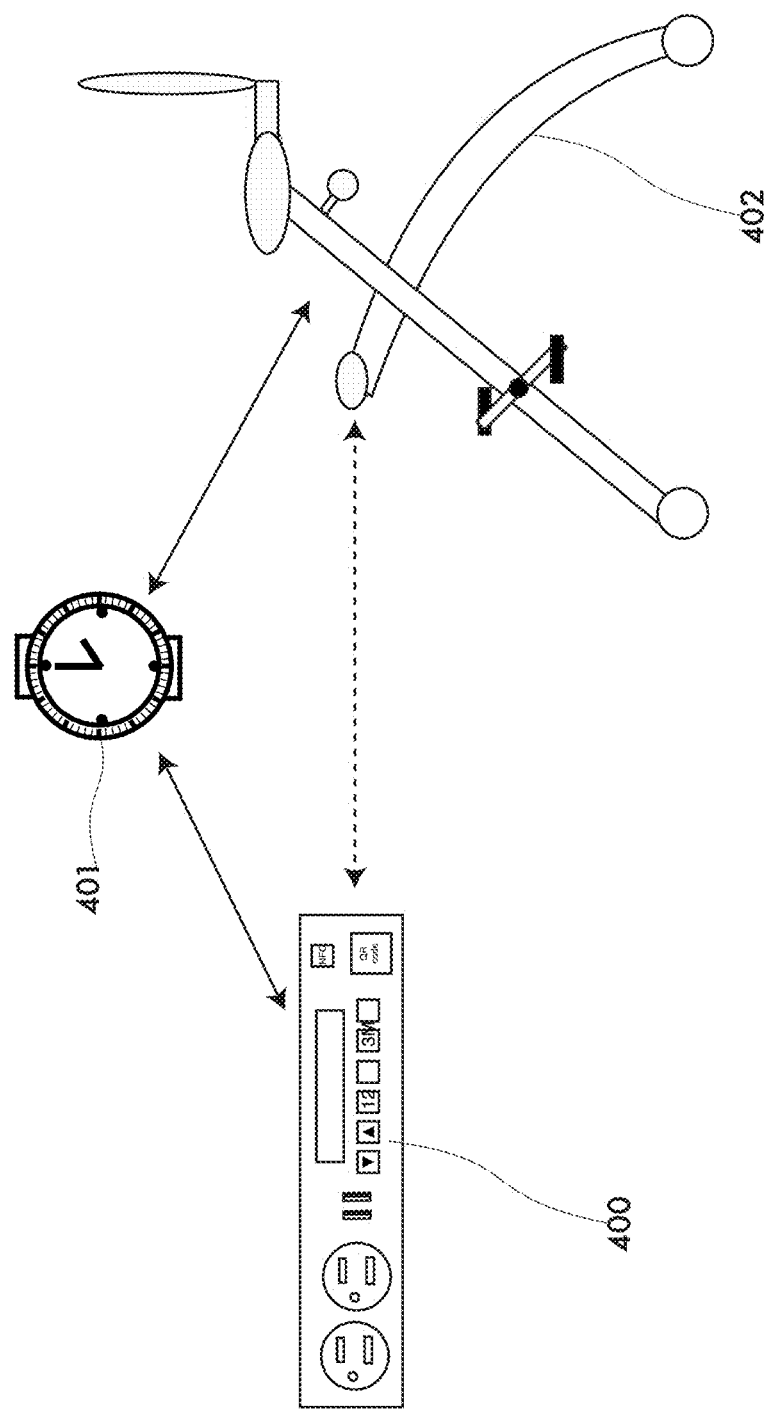
FIG. 4 is a front elevation view of a Smart Desk Controller in use with a Work Space Fitness Device.
Figure 5:
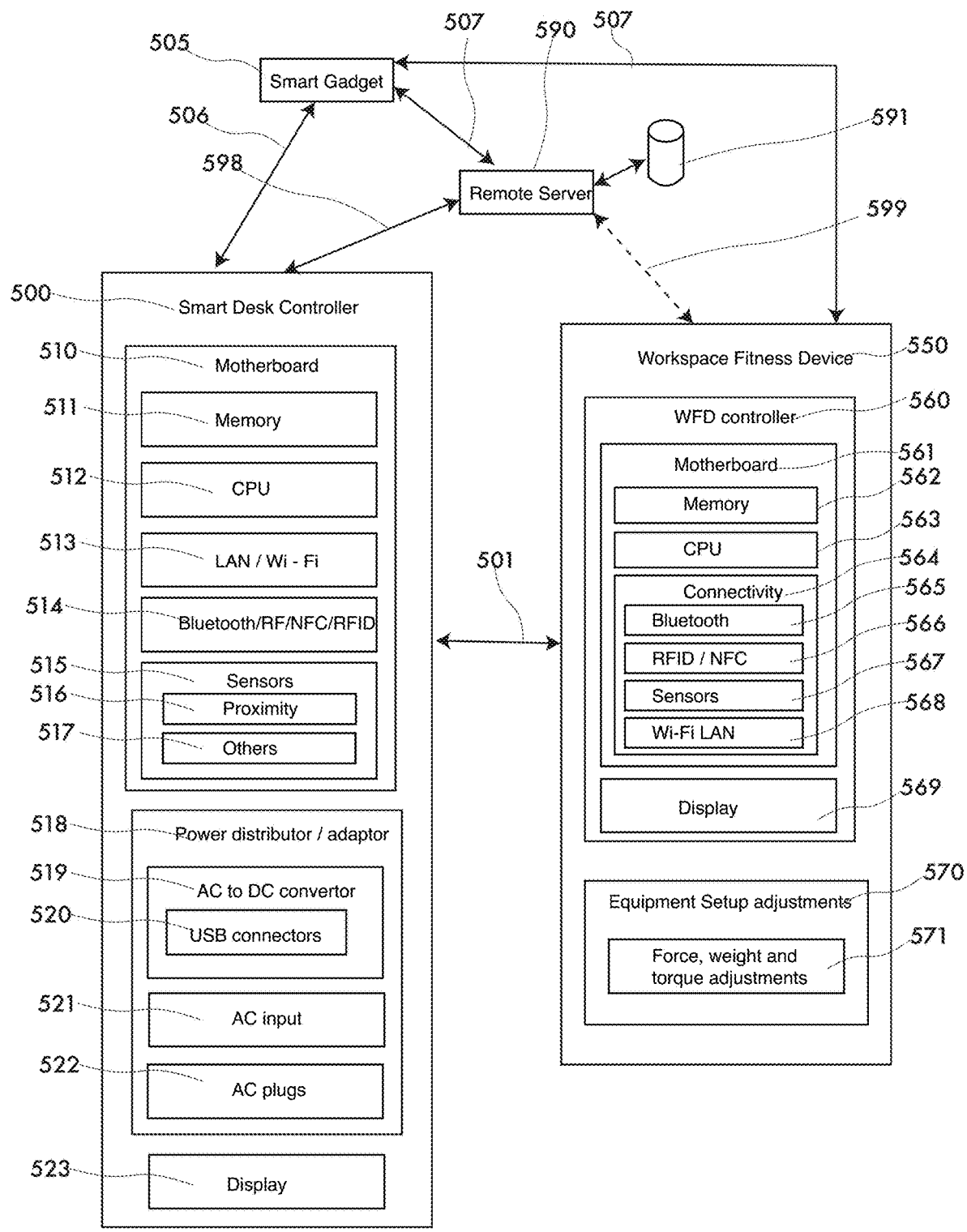
FIG. 5 is a schematic diagram of a Smart Desk Controller in use with a Work Space Fitness Device.

FIGS. 4 and 5 describe another component of our invention—the Workspace Fitness Devices. These devices are modifications of conventional fitness devices such as an under-the-desk bike, a yoga ball, or a stepper (to name a few), that have some electronics that we identify as a Workspace Fitness Device controller. In some parts of this document, we refer to the Workspace Fitness Device as such or as an IOT-FD device (Internet of Things Fitness Device).

Our invention is a Is a network of interconnected Workspace Fitness Devices (WFD) that connect to other WFDs or to the Smart Desk Controller (SDC).

The SDC controls the main connectivity of the activities to the remote server and database (cloud or a similar system). The SDC reads the user's ID and pairs it with the interconnected Workspace Fitness Devices connected to the Sit-and-Stand Desk where the SDC is located or to another device within the same network of interconnected Workspace Fitness Devices.

The typical recommendation for a Sit-and-Stand Desk user is to use the stand function for at least one hour a day.

In one embodiment of our invention, one characteristic of our invention is that the WFD itself, does not identify the user, but the WFD is part of a paired network of devices connected to a user or individual. In essence, a user has a Sit-and-Stand Desk with an intelligent controller such as the Smart Desk Controller described above, and a series of peripheral devices such as an intelligent chair, an intelligent board for balance, a stationary under-the-desk bike, and an intelligent stepper, which we also identify as Workspace Fitness Devices.

A Smart Desk Controller that is installed in a dedicated space within the tabletop. In a different embodiment of our invention, the Smart Desk Controller is installed to the bottom or top of a tabletop.

A Smart Desk Controller that also functions as a hub for energy (AC and DC power)

A Smart Desk Controller that has IOT capabilities (LAN. Wi-Fi and NFC)

The Smart Desk Controller that has sensors to detect the presence of nearby Workspace Fitness Devices. Those sensors are one or a combination from the group of proximity sensors, electromagnetic sensors, RF communication between the Smart Desc Controller and the Workspace Fitness Device, or a triangulation of remote sensing by using the user's smart gadgets or smartwatches as bridges to determine by time and distance there's a close presence.

One familiar with the art will understand that a user cannot use more than one workspace fitness device at a time. For example, he/she can use the chair while the desk is in the sitting position, but if he/she positions the desk to the standing position, he/she can use any of the peripheral WFDs. Because the Smart Desk Controller has a built-in Workspace Fitness Device proximity sensor, by the mere fact that the WFD is close to the desk, that WFD is identified as being used by the user of that desk. There is no need for the user to identify each individual device as its own. This is practical even when there are offices sharing multiple WFDs. For example, an office can have 100 Smart Sit-and-Stand Desks but they may only need 20 Smart Under-the-desk Bikes, and/or 20 Smart Balance-Boards.

Figure 6:
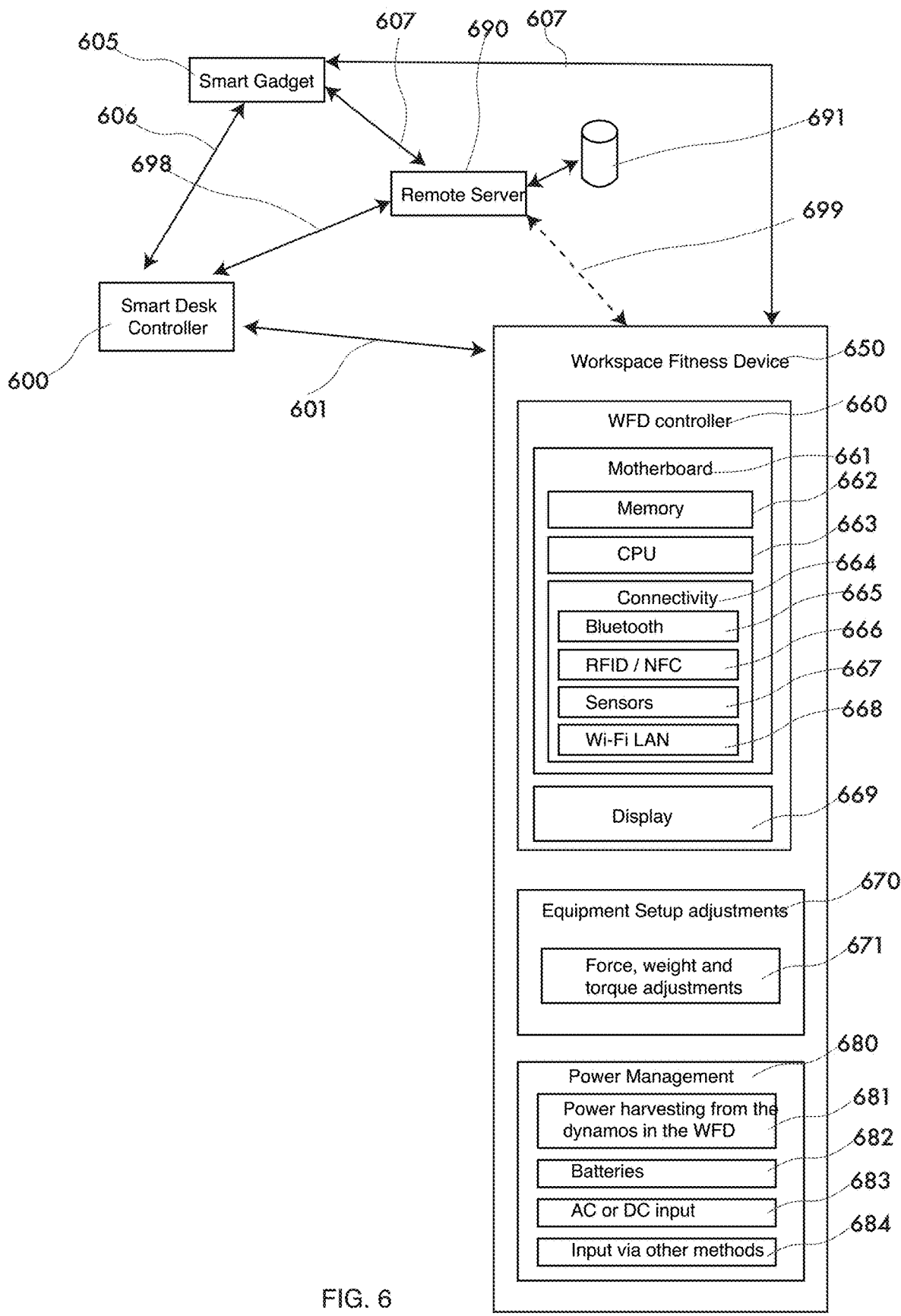
FIG. 6 is a schematic diagram of a variation of Smart Desk Controller in use with a Work Space Fitness Device.

FIG. 6 shows how the Workspace Fitness Device has a built-in controller that is battery-powered. In a different embodiment of our invention, the WFD can also harvest power from the WFD itself by capturing user-generated energy while the user operates the WFD (i.e. a user pedals a Smart Under-the-desk Bike with a power harvesting mechanism). The power harvested is then used to power the WFD controller or Workspace Fitness Controller.

A WFD can take a variety of shapes and sizes, from a Smart under-the-desk bike—a type of stationary bike specifically designed to be low profile and fit under a Sit-and-Stand Desk—to a much simpler stepper.

The Smart under-the-desk bike features an adjustable tension resistance to select the level of power needed to be applied by the user in order to turn the cranks/pedals. Whereas the WFD stepper has an adjustable sensor to adjust the power the user needs to apply in order to move one foot down.

The aforementioned products are just a few examples and it should be noted that the embodiment of a WFD is not limited to those previously mentioned.

Each WFD has a controller, such controller can have a CPU or a system-on-card type device that can have one or more of the following methods of communication: Bluetooth, NFC, RFID, Wi-Fi, or any other radio frequency-emitting device that communicates either directly to the Smart Desk Controller or directly through to a remote server.

In a different embodiment of our invention, the WFD controller, or Workspace Fitness Controller, also has a GPS that can work under the wi-fi network, cell LAN network, or by satellite triangulation. One of the purposes for the GPS is to be able to locate the WFD inside a specific geographic area as described in the software app description in this document.

The controller can send signals to the remote server in order notify the server's database if the WFD is in use, who the user is, the time the device has been in use, if the device is reserved for a specific time of the day, and what the WFD's health status is, among other data described throughout this document.

The controller also connects to the Smart Desk Controller, which is able to recognize who is using that desk, and because of the proximity of the WFD to the smart desk, the Smart Desk Controller could determine that the same user of the Smart Sit-and-Stand Desk where the Smart Desk Controller is installed, is the same person who is using the WFD.

The WFD has sensors and transmitters such as proximity sensors and geolocation ping transmitters that help locate the WFD in a specific geographic area.

A Smart desk controller (600) connects (698) to a remote server (690) which has a database (691) and runs its own software (692 not shown). The Smart Desk Controller also connects (601) to a Workspace Fitness Device (650) or WFD. The WFD can optionally directly connect (699) to the same remote Server (690).

The Smart Desk Controller (600) is installed in the tabletop of the desk (not shown), it consists of a cabinet with a Motherboard (610) which has a memory (611), a CPU (612), and wi-fi/LAN connectivity (613) to connect to other devices such as other Smart Desk Controllers (600), Workspace Fitness Devices (650), or connection (698) with cloud services such as a remote server (690) with a database (691), bluetooth, Radio Frequency, Near Field Connection (NFC), RFID and other radio connectivity options (614), and Sensors (615) such as proximity sensors (616) for detecting a nearby Workspace Fitness Device (650). One familiar with the art will notice that there could be other types of sensors not described here and there could be other components necessary for the functioning of the Smart Desk Controller such as batteries, harnesses, and other such components not mentioned in this description. The smart Desk controller (600) also has a power distribution system (618) with adaptors, the distribution system consists of AC plugs (622) and DC USB connectors (620) located in different parts of the Smart Desk Controller (600) to provide power to other devices such as cell phones, computers, and monitors, among others. It also has AC inputs (621) from the power coming from the leg's cables (not shown).

The workspace fitness device (650) is one from the group consisting of an under-the-desk bicycle, steppers, twisters, boards, yoga balls and other similar devices used for fitness while using the regular desk or table, a Sit-and-Stand Desk, or other similar desks.

The workspace fitness device (650) has a controller (660) that connects to the equipment adjustments which can include the force, weight, or torque adjustments (671) (to name a few). Such adjustments affect the overall performance of the user and should be considered for the overall fitness monitoring computed within the remote server (690). The Workspace fitness device's controller (660) consist of a Motherboard (661 with a memory (662), CPU (663) and connectivity devices (666) such as the bluetooth (666), RFID and NFC (666), sensors (667) including proximity and other sensors as well as a LAN or W-Fi connection (668). Such connections are used to connect (601) with the Smart Desk Controller, or to connect (699) with the remote server (690). One familiar with the art, understands that this is a redundant connection between the Workspace Fitness Device (WFD), the Smart Desk Controller, the smart gadget, and the remote server. As such, the connectivity between each one of those devices can be accomplished by using the connected device as a bridge. For example, the WFD can be connected to the Smart Desk Controller, but not to the internet noro the remote server or smart gadget. But because the WFD is connected to the Smart Desk Controller, the Smart Desk Controller acts as a bridge to patch the communication needed between the WFD and the smart gadget. For example, based on the scenario just explained, a user can control the torque of the WFD using his/her smart gadget even if the WFD is not connected to the internet but is connected to the Smart Desk Controller.

The smart gadget is one from the group consisting of a cell phone, tablet, smartwatch, pc, laptop, or similar devices.

In a different embodiment of our invention, the Smart Desk Controller has an HDMI-out port (not shown in the figures) that connects to the secondary port of the user's monitor that is present at the Sit-and-Stand Desk.

When the user is logged into the SDC, the HDMI port shuts down any signal sent through the HDMI port, hence, giving priority to the desktop or laptop computer's HDMI display information to display to the user's monitor.

When the user is not logged in and is not using the monitor on top of the Sit-and-Stand Desk, the SDC can send information through the HDMI port to display information such as reservation information from the remote management system as explained in Pat13. That information can only be displayed for determined periods of time at specific hours, that way saving energy from the monitor display.

Alternatively, in a different embodiment of our invention, the keyboard at the SDC can wake up the display information sent to the monitor. In this case, if a user wants to see information related to the SDC, the SDC can display that information to the monitor as requested. This is useful if someone wants to know if the Sit-and-Stand Desk is reserved as explained in Pat13, but may want to check until what time the reservation is valid.

FIG. 4 shows how a Smart Desk Controller (400) and a Workspace Fitness Device communicate. A user (not shown) uses the Smart Sit-and-Stand Desk (not shown) where the Smart Desk Controller is installed. With the use of the proximity sensor, the NFC reader or bluetooth connectivity, the Smart Desk Controller (400) identifies the presence of a Workspace Fitness Device (402). The controller of the WFD (not shown) communicates with the Smart Desk Controller (400) and transmits all of the collected data from the user's performance while using the WFD.

In a different embodiment of our invention, a Smart Desk Controller (400) that detects or communicates in proximity to a smartwatch (401) or smart gadget such as a tablet or smartphone that the user is wearing or storing in his pocket (as an example). The smartwatch (401) is also in close proximity to a WFD (402). The SDC (400) might not sense, see or communicate directly with the WFD (402), but the smartwatch (401) can be the link between the SDC (400) and the WFD (402) in case no direct connection between the SDC and the WFD is possible. This is an option to determine if a WFD is located within the workspace of the user. One familiar with the art will understand that the determination of the use can be completed by having at least a couple of the devices connecting to a remote server or connecting with each other and determining the use of the SDC and the WFD based on time, distance, or physical proximity to the WFD.

FIG. 5 shows a flowchart in accordance with one or more embodiments of our invention. While the various steps in these flowcharts are presented and described sequentially, one of ordinary skill will appreciate that some, or all of the steps presented may be executed in no particular order, may be combined or omitted, and some, or all of the steps may be executed in parallel. Furthermore, the steps may be performed actively or passively.

FIG. 5 shows a flowchart describing the communication between a Smart Sit and Stand Desk with an integrated Smart Desk Controller and a Workspace Fitness Device in accordance with one or more embodiments of the invention. FIG. 5 shows a Smart Desk Controller (500) that includes a Motherboard (510) with a memory (511), CPU (51), LAN and W-Fi card (513), a radio communication mechanism with Bluetooth, Radio Frequency, NFC and/or RFID (514)

and proximity and other sensors (515, 516, 517), and has an optional display (523) that is optionally connected to a power distributor or adaptor (518) with an AC to DC converter (519) that provides DC power to foreign devices via a USB connector (520) and has AC input (51) and AC output plugs (522). That Smart Desk Controller (500) connects (598) via a network or the internet to a remote server (590) that also connects to a database (591). Such a database contains the names or personal identifications of the users and keeps track of their performance data, preference settings, and other relevant information such as their preferred devices, average times of use per devices, etc. The information in the database can be password-protected and access to the data can be limited by the user or groups of users. The remote server is also open for connections (507) to smart gadgets (505), which can access the information contained in the database once account access is validated. The Smart Gadget can communicate directly to the Smart Desk Controller (500) using one of two methods of connection, either by connecting via the internet relay (507) using the server (590) as a bridge or a direct communication (506) with the Smart Desk Controller (500) using either bluetooth or other Radio Frequency (RF) means.

The Smart Desk Controller (500) may communicate directly to the Workspace Fitness Device (550) using either a local connection (501) such as NFC, Bluetooth, or other RF means of communication, as well as by using the remote server as a relay or bridge, or by simultaneously accessing the information at the remote server database (591).

One familiar with the art will appreciate that the communication between the Smart Desk Controller and the WFD can be opened or started using one method, and once the communication is open, switch to other methods. For example, using an NFC reader to identify the device, and once the device is identified, switch to Bluetooth communication to carry all of the data transfer needed. Alternatively, one may use the NFC as a means of opening the communication, but once identification is performed, use the joint connection to the Remote server to communicate between both devices.

One familiar with the art will also appreciate that in order for the WFD (550) to access data from the remote server database (591) a direct connection from the WFD and the database via the internet may not be required, as the Smart Desk Controller (500) can be used as a bridge or relay to connect the WFD (550) to the Remote server (590) and then to the database (591).

Viceversa, the Smart Desk Controller can communicate with the Remote server and the database without the need of an Internet connection if a connection with the WFD is established and the connection between the WFD and the database is active in any other way.

FIG. 6 is a continuation of FIG. 5 from the point of view of the Workspace Fitness Device.

Throughout this application, we have been talking about how the Smart Desk Controller communicates with the Remote Server and Database and how external devices such as smart gadgets, for example: smartphones, laptops, or tablets, can also connect to the remote server and access the data stored in the database This part of our invention corresponds to a software app. Data captured by the Smart Desk Controller and shared directly to other devices or a remote server can be viewed and controlled in a software app. Features of this app include: the total amount of time the desk is in the standing position, time in the sitting position, and time of use (based on picks from the wattage use and sensors in the tabletop) and positions (up, down). In a different embodiment of our invention, the data collection or data sharing can optionally be disabled by the administrator. The software administrator can be the user of the device, the employee, the employer or the administrator of the office facility (to name a few).

The data collected from the Smart Desk Controller or the remote server can be shared with fitness tracking devices such as fitbits or smartwatches. Secondary devices can be paired with the Smart Desk Controller. Such secondary devices include, but are not limited to: smartphones, tablets, smartwatches, fitness bands, computers or laptops (to name a few).

Our invention also includes a software application and a remote cloud environment service. Such services, data, and features are available when the Smart Desk Controller connects to a secondary wired or wireless device, the secondary device can be one from the group of a laptop, PC, smartphone, tablet or a remotely connected server (Remote Server) that can share data via an internet connection. The software app features includes the capability to remotely control the height of the Smart Sit-and-Stand Desk from the smartphone app, run statistics on how long the person sits or stands, or track position changes made by the user, all of which are monitored by the Smart Desk Controller.

In a different embodiment of our invention, the software runs sit and stand challenges among colleagues and other sit and stand device users, it monitors and displays the amount of wattage used by the devices connected to the desk, it can send alerts if intruders open the desk drawers, and it has display alerts when controlling the desk, such as "heads up to see if there aren't any objects blocking the desk when coming down".

In a different embodiment of our invention, the software application features one-touch elevation for when a user wants to set the height of the Smart Sit-and-Stand Desk to a predetermined height with the single touch of a button from a remote secondary device.

Other features include sit-stand tracking—to keep track of the time of the day and a minute count of the minutes spent at different positions, a sit-stand reminder that is audible, visible and automatic, and a "do not disturb" light that is displayed on the user's smartphone, tablet, or similar device with a monitor light, code, or words to allow other people in the same office space that the user of that desk doesn't want to be disturbed.

In a different embodiment of our invention, Workspace Fitness Devices and accessories include a Smart Mat that can sense or measure the presence of a user.

The Smart Mat may also capture the energy produced by the user and connects to the Smart Desk Controller by wired or wireless connection to provide relevant statistics and data to users.

All peripherals send data to the app, thus, that data can be collected by other platforms/apps such as a fitbit for complete overall input from the user.

Figure 7:
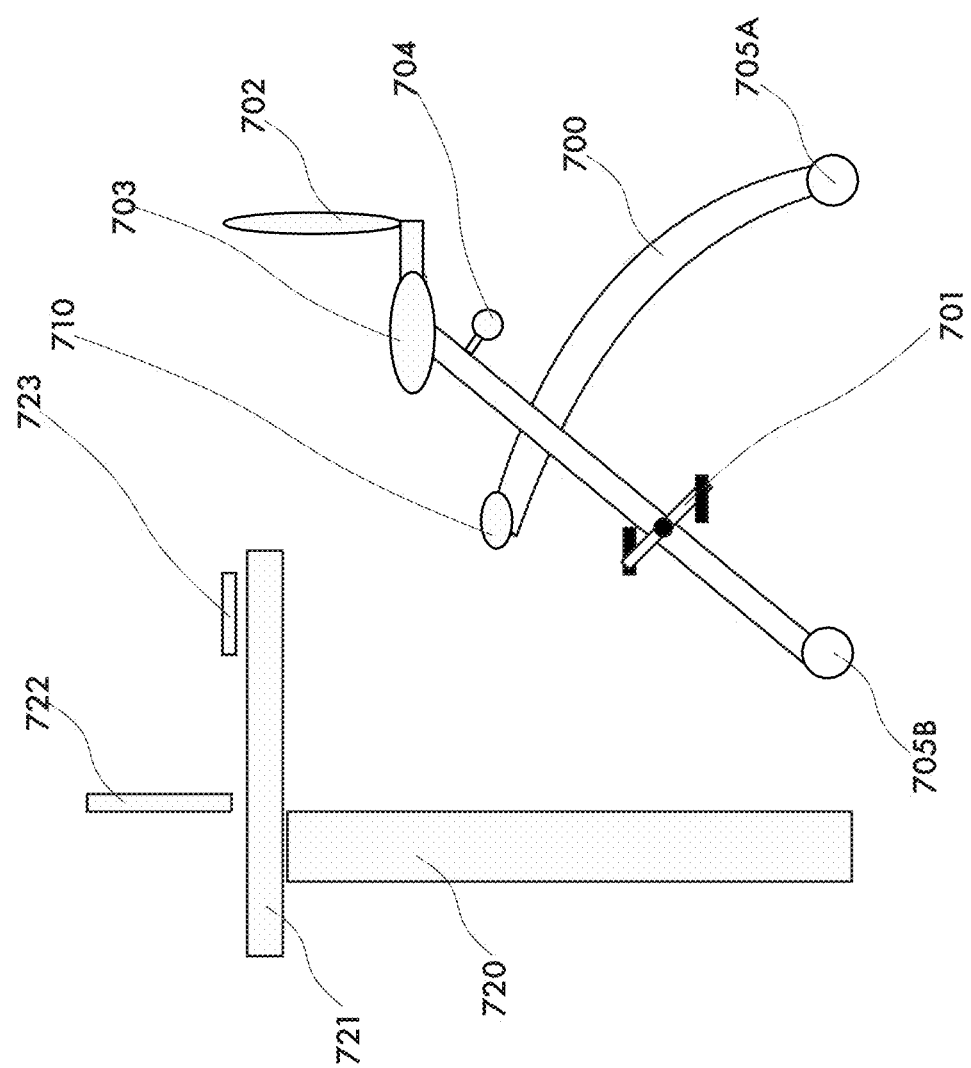
FIG. 7 is a side elevation view where the Work Space Fitness Device is an under the desk bike.

FIG. 7 shows a side view of an under-the-desk bike (700) that is under a desk (720). In this example, the under-the-desk bike is a WFD; however, one familiar with the art will know that there are other WFD devices, and all of them share very similar characteristics. Some examples include (but are not limited to) a stand, a seat (703), a backrest (702), an adjusting knob (704), and in the case of a bike: a set of cranks (701), a base, or rollers (705A and 705B and a controller (710) with or without a display. The controller that reads the data from the cranks and adjusts the torque of the cranks to be either lighter or harder, allowing the user to exercise at varying intensities.

Figure 8B:
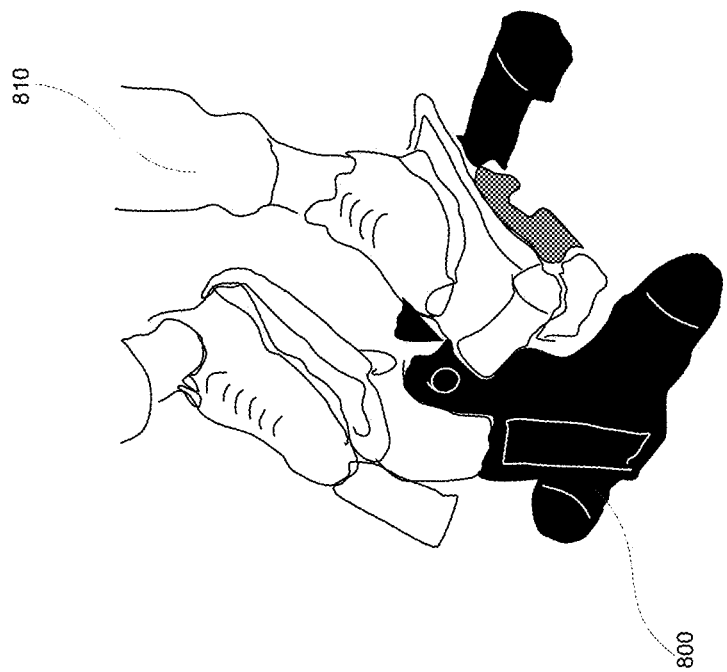
FIG. 8 is a front elevation view where the Work Space Fitness Device is a stepper.
Figure 8A:
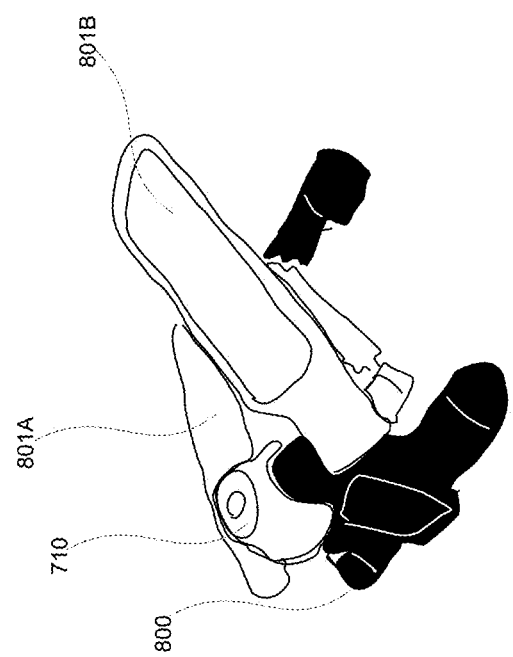

FIGS. 8A and 8B show a side perspective view of a stepper (800) that acts as WFD. The stepper consists of a controller (710) and a pair of pneumatic-driven steps (801A, 801B). Moreover, the controller is connected to the pneumatic adjustment to increase or decrease the pressure of the steps. FIG. 8B shows a user (810) using the stepper (800) WFD.

All of the data from the under-the-desk bike and stepper is sent to the remote management server either via a direct connection through a LAN or an indirect connection via the Smart Desk Controller at the user's desk. Another method for direct transmission to the remote management server is via the user's smart devices. Suitable devices include smartwatches, tablets, or smartphone devices that are able to connect to the WFD.

Power is generated/harvested through the turning/pedaling of the cranks (in the case of an under-the-desk bike) or through the up and down movement of pneumatic steps (in the case of a stepper). The captured energy is then transmitted to the power management source which can send it directly to the device's batteries or to power any of the WFD's components, such as the controller or motors. Unlike devices that can be found at a gym, the Workspace Fitness Device is a portable device (WFD) that the user moves close to the workstation or area where the user will use it. Unlike in a gym, where the user goes to the machine—the machine goes to the user.

The WFD logs the user by having the user tap into the SDC, not the device. Because the WFD is within the geographic space or within reach of sensors of the SDC, the WFD is identified as being at that particular workspace. Unlike at a gym with IOT devices, where the user taps into the fitness device, in our invention, the user taps into the SDC, then, the SDC connects to the WFD. In a different embodiment of our invention, the user may tap directly to the WFD and the WFD may send information to the server via a direct connection between the WFD and the SDC, the WFD via LAN with the remote server, the WFD to the smart gadget of the user which then connects directly to the remote server, or the smart gadget to the SDC.

The UI to locate the WFD could be in the smartwatch, the smart gadget, PC, Laptop, or web portal. The UI has several functions: turn off an audible alarm or alarm alert, or locate via GPS, as some examples.

The WFD has the capability to have a GPS and an audible alarm as a means for location tracking. The smartwatch can request the smart desk controller to turn off an audible alert at the WFD when, for example, the user needs to locate the WFD that he/she has reserved or he/she wants to use when someone (or no one) is using it within a building floor or an office space. With the GPS, the user may track the WFD he wants to use with an audible alert; thereby, making it easier for the user to locate the device.

In a different embodiment of our invention, the WFD can lock itself to prevent its use when a user or a system-wide alert is sent to the WFD. Reasons to lock the device may include (but are not limited to) a timer or the fact that a different user from the one who is using it in that moment has it reserved for that period of time. By locking the device, it prevents unauthorized use and encourages people to reserve the WFD in the web-portal or management system when available.

When a user who has a WFD reserved is looking for it, the audible alert and the locking of the WFD functionality may be triggered.

The locking of the WFD can be—in the case of the under-the-desk bike—to lock the cranks or tighten them as high as possible so it is uncomfortable or impossible for the user to pedal the bike. For the stepper, the locking mechanism can also be to tighten the adjustment so the stepper is no longer operational. In the case of the Yoga Ball, there might not be a locking mechanism, but the controller could also vibrate in such a way that the yoga ball might be uncomfortable for the user to sit on. The WFD device also has functionality to prevent unauthorized use of the device in such a way that when, for example, a child starts using the WFD in an unintended manner (such as pedaling excessively rapidly) the WFD device can detect the WFD is being used in an unintended manner and it can either lock itself, make it very hard, or turn on the audible alarm to prevent unauthorized use. A user can override this feature in case he/she wants to use it for higher performance. For example, the WFDs are meant to be used for workspace fitness, not as gym equipment. In this case, the WFDs are meant for low performance—i.e. low pace fitness. In a different embodiment of our invention a WFD could be a gym equipment alternative.

When the WFD device has mechanical parts that cannot be adjusted automatically from the smart gadget controlling it or when the WFD device can sense the user's preference while in motion, that information is also stored and shared to the paired smart gadget devices via means of the remote management database system. That way, when a user is using a WFD, the smart gadget can display the user's preferences at that particular WFD. For example, a user uses the under-the-desk bike which has a manual seat height adjustment, thus, when the user adjusts the seat to sit at 12", the under-the-desk bike has a sensor that knows the seat is set at a height of 12". Furthermore, if the user decides to use the same model of under-the-desk bike on a different day and/or it is not exactly the same WFD he/she was using before, the display on his/her smart device will display the seat height setting; which, in this case, will remind the user that his/her preferred or last setting was at 12" for the seat height. In a different embodiment of our invention, when a sensor for the mechanical adjustment is not present, the system may request the user to input or take a photo of the height adjustment using his/her smart device. That way, the remote management database system can keep track of it.

The WFD also has a way to automatically set the desired settings adjustments for that particular user when he/she is using that WFD. For example, a user will start using a WFD (i.e. an under-the-desk bike) and it will be paired or sensed by the smart desk controller or the login information from the smart device and the WFD will identify the user. Then, the WFD—in this case, the under the desk bike—will be set to the required torque and performance requirements as set by the user.

In all cases, those commands can be overwritten by the user or an administrator.

Figure 9:
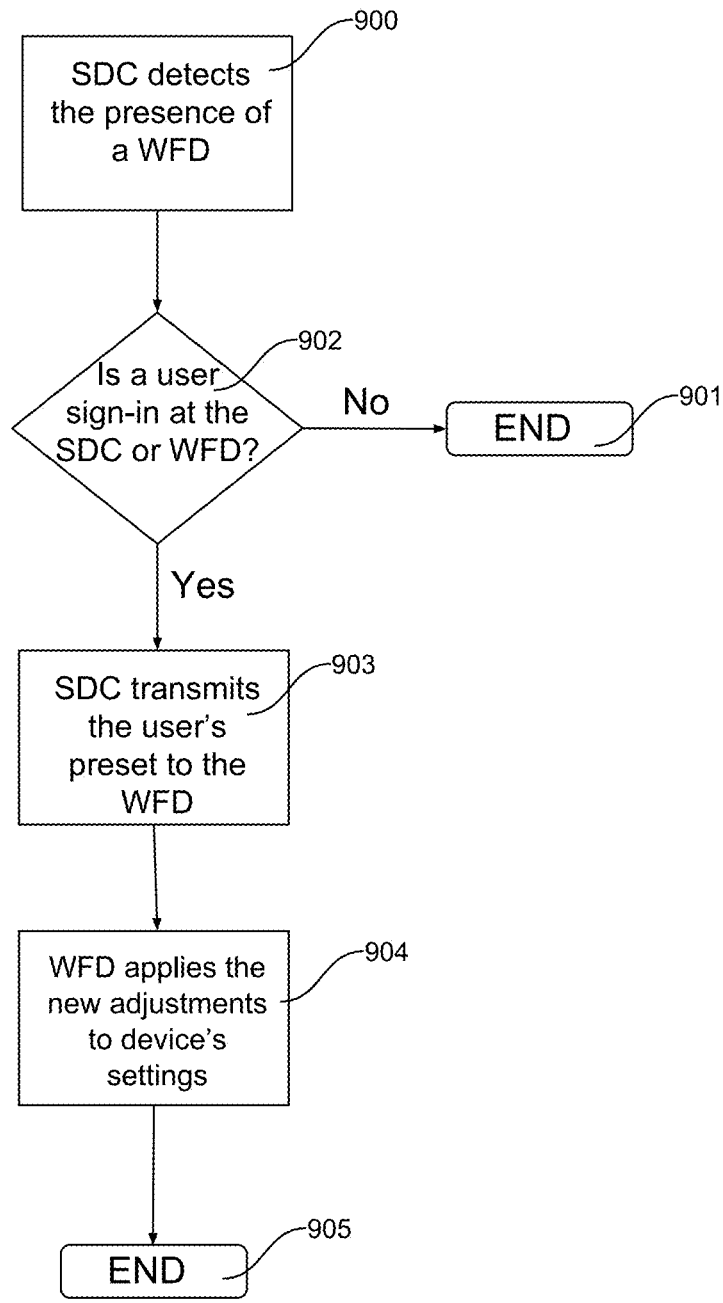
FIG. 9 is a flow chart of application logic of the Smart Desk Controller.

FIG. 9 shows a flowchart of the operation of the Smart Desk Controller (SDC) acting in the presence of a Workspace Fitness Device (WFD). One familiar with the art will appreciate that any reference to the Smart Desk Controller should imply that the Smart Desk Controller is installed or embedded within the Smart Sit-and-Stand Desk. Step 900 describes when a SDC detects the presence of a WFD. In a normal office work day, a user may use the Smart Sit-and-Stand Desk in the sitting position for a certain amount of time and in the standing position for the remainder The positions and activities on the Smart Sit-and-Stand Desk could vary depending on the type of position or use the user wants. Part of the experience of using our solution is to use peripherals such as the Workspace Fitness Devices (WFD), including the Smart under-the-desk bike, which, in some cases could be stored in a different area than the workstation, as some office spaces may be space-limited, while others may allow the user to share the use of WFDs with office colleagues, given that the use of the WFD (in most cases) is for just a small percentage of the time a user spends sitting behind the desk. Step 902 makes a determination if a user has signed-in to the SDC or WFD. A user can sign-in to a SDC or to a WFD as well, the user does not need to be signed-in on both devices at the same time, as described in this flowchart. If the user is not signed-in on either device, then there is nothing else to do. If a user is signed-in on at least one of the devices, then he/she may proceed to step 903 where the SDC and the WFD share the user's preset information. One familiar with the art will appreciate that either device could be the one the user is signed-in to. This makes that device "device #1", whereas the device where the user is not signed-in to is known as "device #2". Device #1 is responsible for transmitting the user's preset information via the transfer method that was previously described in this document. Step 904 describes that the WFD then applies the adjustments to the presets in that device. Such presets could be the tension, the height, or any other variable that can be electronically manipulated while seated at the WFD remotely.

Figure 10:
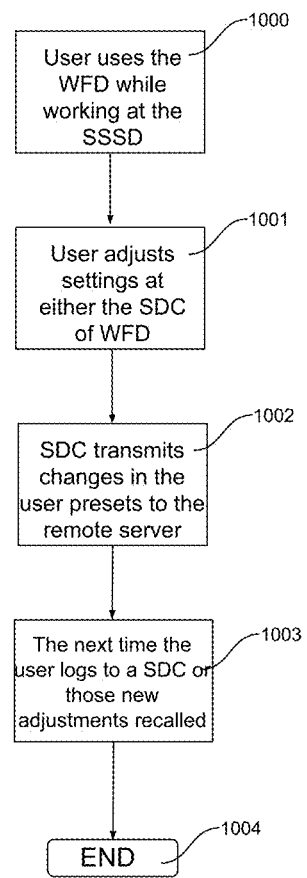
FIG. 10 is a flow chart of application logic of the Smart Desk Controller where there are preset preferences.
Figure 11:
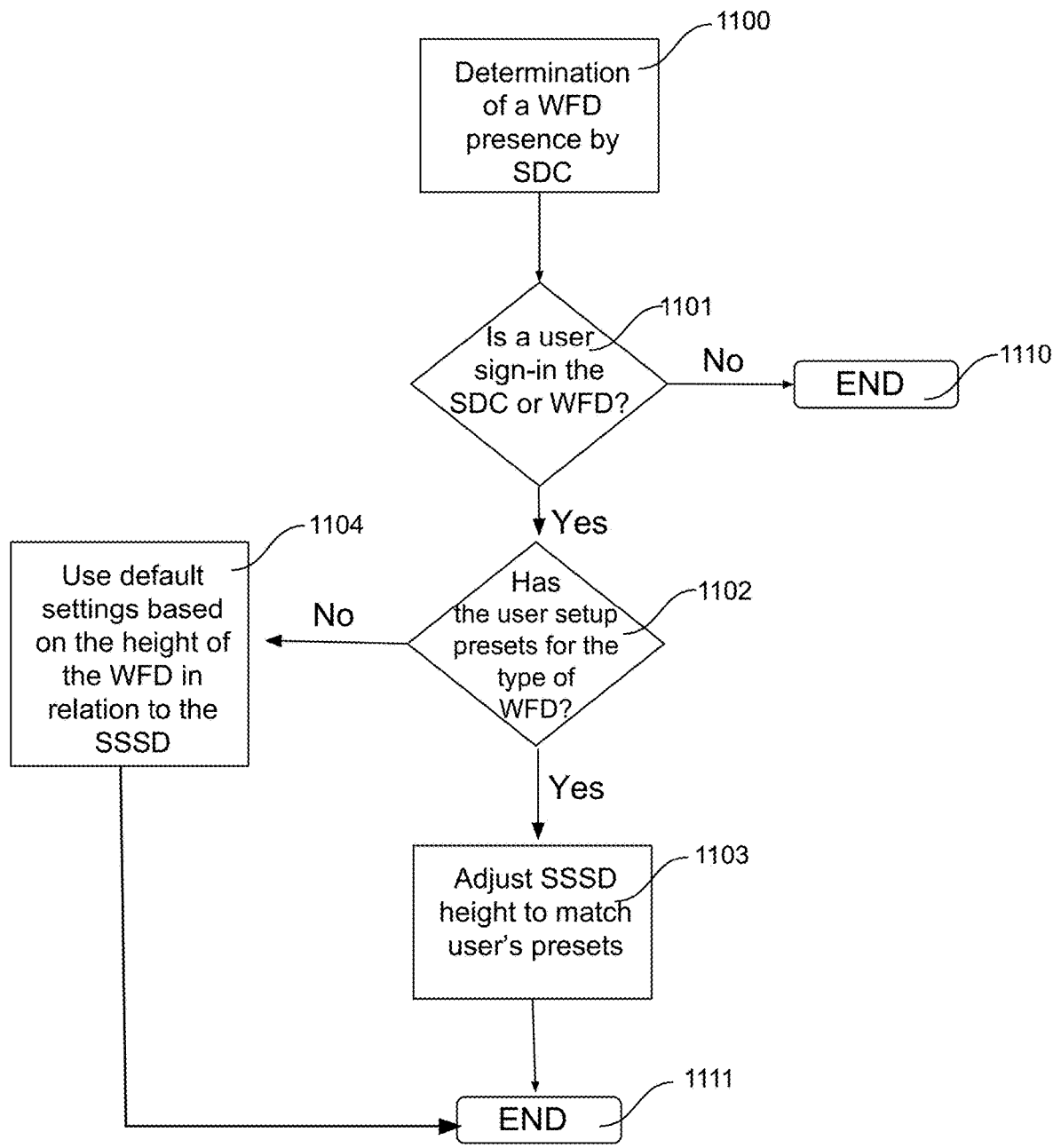
FIG. 11 is a flow chart of application logic of the Smart Desk Controller determining whether a Work Space Fitness Device is in proximity to the Smart Desk Controller.

FIGS. 9 through 11 show the relationship between Workspace Fitness Devices, Smart Desk Controllers, cloud services, and Software. More specifically, an iOS and Android application that allows the user to setup his/her desk based on the information provided earlier in this document.

The software or mobile application captures the input of the person's height, then, comparing it to a table, calculates the positioning of the elements such as the seat or the WFD, including the seat, keyboard, and screen heights in relationship with the eyes of the user.

If the user operates the under the desk bike, height and weight are also considered.

Our invention also includes two other forms of measurement that are taken into consideration when using our Workspace Fitness Devices (WFD)—including our under-the-desk bike, stepper, and balance board. Our database has the required height adjustments for the use of those devices and our algorithm performs calculations based on each user's specific needs.

Also includes the elbow-height range and other data based on the ergonomy of the person.

That is done with a table made up of different variables, or a custom input that will match it with the closest number in our reference table. In a different embodiment of our invention, the input is only done in a range instead of fixed values.

In a different embodiment of our invention, the app also calculates the distance the monitor should be from the face, the tilt of the monitor, or at what angle it should be positioned.

The app also recommends the postures to adopt while standing at the Sit-and-Stand Desk.

In a different embodiment of our invention, the app can also collect information, such as the ID of the user, his/her height, preferences (custom made or from patterns registered at our remote server's database), or the user's favorite WFD device to use (just to name a few).

Case Scenarios for Challenges Description

Mirror co-workers or classroom: a master, set by profile, day, or activity, is the one who controls the ergonomyx devices. For example, a teacher may be the master for the ergonomyx devices in that classroom. When the teacher raises his/her desk up, all of the other desks are also raised unless the teacher is running his/her app in teacher's mode, thus, controlling the devices.

Mirror co-workers by challenge: a challenge may be set by a leader or by votes. Whatever challenge idea receives the most votes is selected to be that week's corporate challenge. The challenge may be among co-workers on the same workplace or families within their separate work areas and school classes. Online tables for social media are also available (need to have a University researcher develop the social media app). Every day could be more challenging, and just like poker, a user can choose standards that are higher than the other members in their workspace and then wait to see if he/she gets re-challenged to choose even higher standards.

Surprise challenge: occurs when many sign up but they don't know what is next—the algorithm randomly chooses for them. The Sit-and-Stand Desk can raise or lower with just a small time frame notice depending on the type of challenge.

Other options available from the main menu include:
Share a photo of your sit stand desk
Share your experience (blog type)
Fun facts about Sit-and-Stand Desks
Literature about the use of Sit-and-Stand Desks
The app that also manages for example:
As the app is connected to a centrally located database management remote server and each of the Smart Desk Controllers, Workspace Fitness Devices (WFD), smartphones, and smart wearables are connected to that database or connected to each other (and at least one of them is connected to the remote server), the database management system can be updated accordingly.

The app can manage equipment reservation within a predetermined area, be that an office space, building floor, an entire building, or a specific geographical area not mentioned in this list.

The way the equipment reservation works is by understanding the needs of the user. A regular office worker, for example, may like to stand for one hour a day on the "stand" position of the desk and rest in the "sit" position for the remaining 7 hours of the work-day. In this case, the user may want to use the under-the-desk bike for 15 minutes (for example). By setting up those preferences, the user may program the smartphone or wearable device to remind themselves that it is time to "stand" after approximately 3 hours of work. Once the alert goes off, the under-the-desk bike should be used. If this is the case, in most offices it is expected to have a ratio of 3 Workspace Fitness Devices (WFD) per every 10 desks in the office. Those 3 devices could vary in the form of an under-the-desk bike, stepper, and a balancing board. The software algorithm manages the WFD inventory and availability. All office workers within a certain area can reserve the available devices to be used within a specific period of time. The Smart Desk Controller identifies the geographical location of the last time a particular WFD has been used by someone in the office. By installing additional optional Smart Desk Controllers in closet areas, the database system could also locate not-in-use devices that are stored in office closets, unused office areas, or empty offices.

Challenges or contests among locally or remotely located coworkers, friends, or family. As all of the devices are connected to each other either via a direct or indirect connection and they all pass through the same remote server, users can create challenges or contests when using any smart-desk-controlled devices, including the Sit-and-Stand Desk and other WFD devices such as the under-the-desk bike, stepper, or balance board. Those challenges may entail recommendations regarding when the user should undergo a specific activity based on a predetermined set of conditions, including the desk's height, the under-the-desk bike resistance level, the stepper's resistance level, and the time of day.

Remotely control the settings of the Sit-and-Stand Desk or WFDs. The user can use the app to modify or program settings for later use, including the tension of the under-the-desk bike or the height of the Sit-and-Stand Desk. Program timers to change those features or to cancel the features.

Users can also monitor the use of individual (or multiple) WFD devices allocated in close proximity to them through the database. That way, supervisors can monitor the use of the devices and the popularity. In extreme cases, mothers can monitor if their sons are doing the required exercising or doctors can monitor if a patient is using the required WFDs.

Our app also works as a gateway for WFDs to connect to the remote server as an indirect connection. As most WFDs only have bluetooth and a local W-Fi connection without Internet, the cellphone on which the app is running can work as a gateway between the WFDs and the remote server to upload and download information such as settings, current user settings, usage data, device health, monitor, etc.

The use of a WFD in a waiting room and a way to promote its use. While waiting for his/her appointment, a person could use the WFD to keep active. Since this "guest" is not a regular user of the device, as described in this document, the "guest still does his/her workout and he/she might already be subscribed to a different fitness band/health monitoring service different from the one described above.

In this case, the user may tap, take a photo of the QR code, download our "guest app" or simply use the device and write a code displayed on the device.

Such code or session number is a reference to the data captured by that WFD while that particular user used the WFD. Once in his home, or at his smart gadget, the user can log into our web portal or the web portal from another company, and insert that code into the computer or smart gadget, the time collected at the WFD is then considered in the overall fitness performance of the user. Since our platform is an open platform, other device-manufacturers can tap into our system and download health fitness data from any or our WFDs, users, or Smart Desk Controllers.

FIG. 10 is a flowchart that shows how the Smart Desk Controller adjusts the settings of the desk based on the user identification when that user has preset preferences when using that device—in this case, the Smart Sit-and-Stand Desk. A user preset is a setting that the user sets. This preset can be the desired height of the Smart Sit-and-Stand Desk, the desired height of the WFD, or any other adjustments such as the tension of the flywheel of the Smart Under-the-desk bike (amongst other examples).

Step 1000 describes how the user uses the workspace fitness device while working at the smart sit and stand desk. One familiar with the art will appreciate that a user may use a workspace fitness device from the group of a smart under-the-desk bike, a smart stepper, or a smart yoga ball. When using the device, it is most likely that the user will be located in front of the desk that has the Smart Desk Controller installed.

Step 1001 describes how the user makes adjustments to the settings at either the Smart Desk Controller (desk) or the Workspace Fitness Device itself.

Once the changes are made, the smart desk controller transmits any changes in the user presets to the remote server, where they are stored and accessible to the user via a web portal or through the app, as described in step 1002.

Step 1003 describes how the next time the user logs to a Smart Desk Controller, those new adjustments are recalled, regardless of whether or not it is the same Smart Sit-and-Stand Desk or Workspace Fitness Device.

FIG. 11 is a flowchart that shows how the Smart Desk Controller can make a determination of the presence of a Workspace Fitness Device located nearby (Step 1100). In step 1101, a determination is requested if a user is signed-in to the Smart Desk Controller or to the Workspace Fitness Device. If the user is not signed-in to either device, then the process ends (1110). Step 1102 describes, how, if the user has signed-in to at least one of the aforementioned devices, then a determination has to be made to check if a user setup preset for that type of Workspace Fitness Device has been made. For example, if this is the first time a user is using a Smart Sit-and-Stand Desk (workspace fitness device), then, a user preset for this user does not exist for this type of device. If the user preset does not exist, then proceed to step 1104. Alternatively, in the case that a user preset does exist, then proceed to step 1103.

Step 1103, adjusts the Smart Sit-and-Stand Desk to match the user's preset, then the process ends (1111).

Continuing with step 1104, the smart sit and stand desk must use the default settings based on the height of the workspace fitness device in relation to the smart Sit-and-Stand Desk, then, the process ends (1111).

Figure 12:
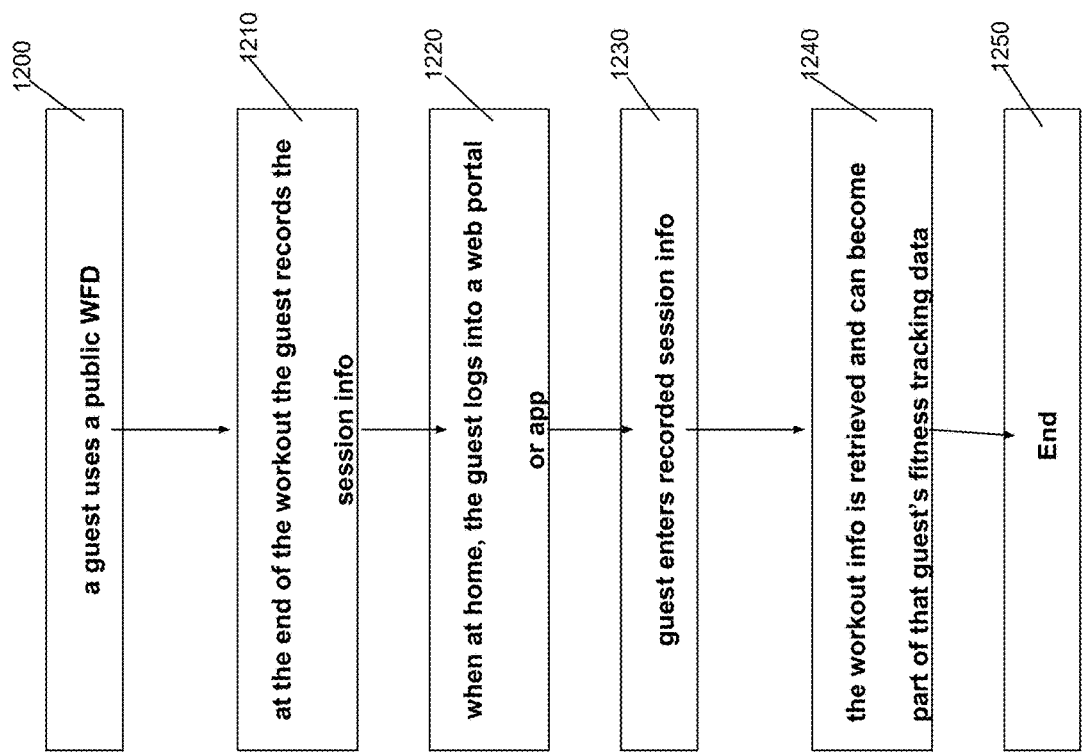
FIG. 12 is a flow chart of use of the Smart Desk Controller from a user's perspective.

FIG. 12 is a flowchart that describes the process from the guest or user's perspective. Step 1200 describes that a guest uses a public WFD. Public WFD are devices that are not linked to a personal account but are open for many people to use that same device. WFD identify themselves when they are used in a workspace environment and when the devices are paired with Smart Desk Controllers. If in the case a guest will use the WFD without the login credentials and simply walks up and uses the WFD. The guest may expect to collect the information or data captured by the WFD for that workout. In Step 1210, at the end of the workout the guest records the session info. The method to record the session info is from one of the following group: by reading a QR code displayed on the screen of the WFD or a QR code printed on the WFD, by using our app in his/her phone and reading the QR code displayed or printed on the WFD, by recording or writing the serial number of the WFD. The WFD keeps track of the time the workout happened and the serial number of the WFD that did the job. The WFD (as described in other pages of this document) is connected to a cloud server that keeps track of the data collected by the WFD. Step 1220, when at home, the guest logs into a web portal or app. A web portal from our company or from the guest's fitness-device provider that is linked to our database where the record of his workout is kept. Step 1230, guest enters recorded session info. By correlating the recorded session info with our database, the data from that recorded session can be retrieved by either a screen print or a data file that can be used to integrate into the guest's fitness tracking device or system. Step 1240, the workout info is retrieved and can become part of that guest's fitness tracking data. The web portal or app either integrate that workout into the guest's personal daily record or provide the equivalent to manually input into other devices.

Figure 13:
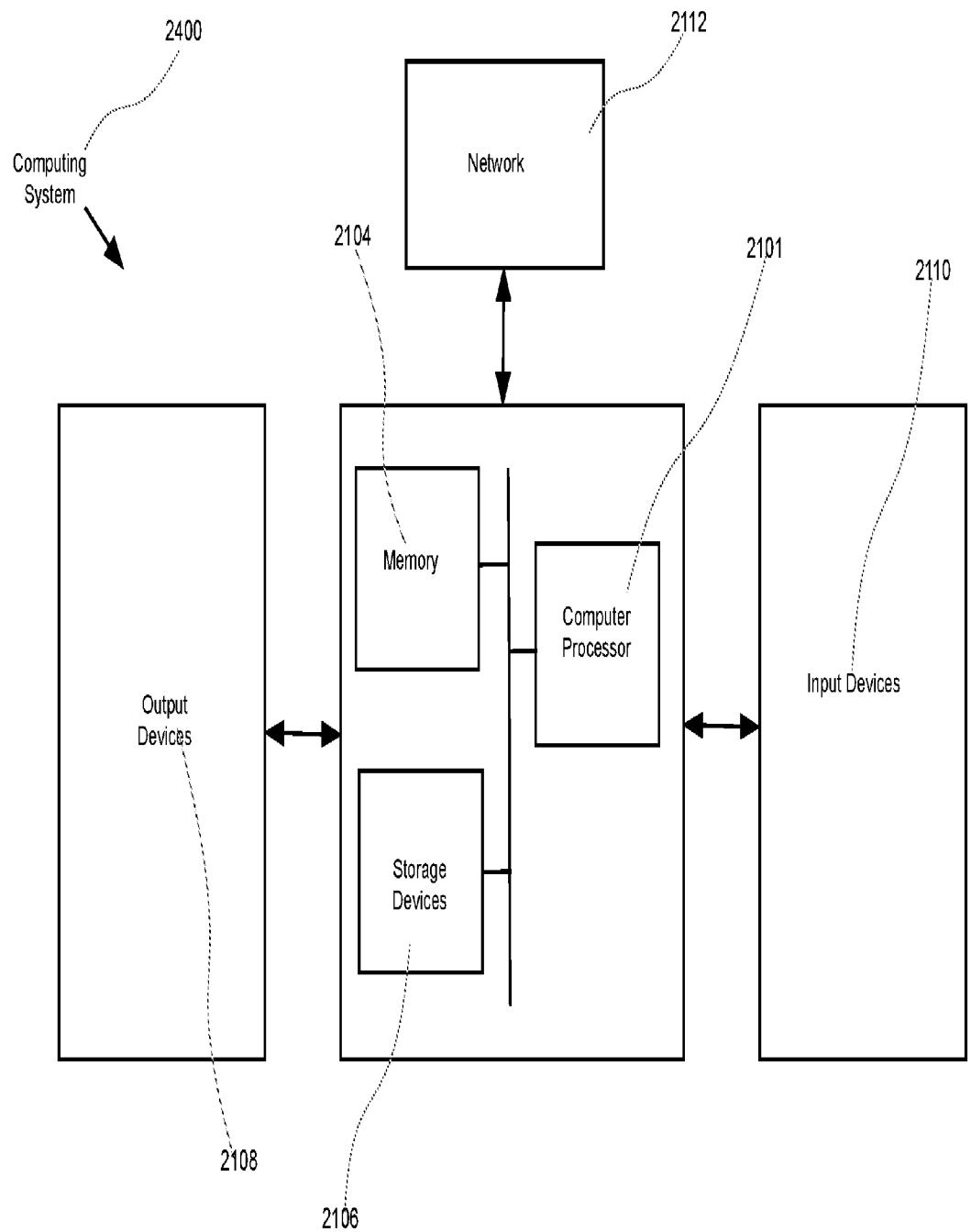
FIG. 13 shows a computing system connected to be a part of a network.

Embodiments of the invention may be implemented on a computing system. Any combination of mobile, desktop, server, router, switch, embedded device, or other types of hardware may be used. For example, as shown in FIG. 13, the computing system (2100) may include one or more computer processors (2101), non-persistent storage (2102) (for example, volatile memory, such as random access memory (RAM), cache memory), persistent storage (2103) (for example, a hard disk, an optical drive such as a compact disk (CD) drive or digital versatile disk (DVD) drive, a flash memory, etc.), a communication interface (2104) (for example, Bluetooth interface, infrared interface, network interface, optical interface, etc.), and numerous other elements and functionalities.

The computer processor(s) (2101) may be an integrated circuit for processing instructions. For example, the computer processor(s) may be one or more cores or micro-cores of a processor. The computing system (2100) may also include one or more input devices (2110), such as a touchscreen, keyboard, mouse, microphone, touchpad, electronic pen, or any other type of input device.

The communication interface (2104) may include an integrated circuit for connecting the computing system (2100) to a network (not shown) (for example, a local area network (LAN), a wide area network (WAN) such as the Internet, mobile network, or any other type of network) and/or to another device, such as another computing device.

Further, the computing system (2100) may include one or more output devices (2106), such as a screen (for example, an LCD display, a plasma display, touch screen, cathode ray tube (CRT) monitor, projector, or other display device), a printer, external storage, or any other output device. One or more of the output devices may be the same or different from the input device(s). The input and output device(s) may be locally or remotely connected to the computer processor(s) (2101), non-persistent storage (2102), and persistent storage (2103). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (2100) in FIG. 13 may be connected to or be a part of a network. For example, the network (2110) may include multiple nodes (for example, node X (2111), node Y (2112)). Each node may correspond to a computing system shown in FIG. 13, or a group of nodes combined may correspond to the computing system shown in FIG. 13A. By way of an example, embodiments of the invention may be implemented on a node of a distribution system that is connected to other nodes. By way of another example, embodiments of the invention may be implemented on a distributed computing system having multiple nodes, where each portion of the invention may be located on a different node within the distributed computing system. Further, one or more elements of the aforementioned computing system (2100) may be located at a remote location and connected to the other elements over a network.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An apparatus that keeps track of performance data and user's preferences while using a standing desk and fitness devices, the apparatus comprising:
   more than one workplace fitness device;
   a smart desk controller apparatus that installs inside a desktop surface, comprising: a built-in CPU on a motherboard with networking capabilities, a radio communication device, wherein the CPU connects to a remote server database, wherein the CPU has no external display, wherein the radio communication device is one of a Near Field Communication (NFC), RFID, Wi-Fi or Bluetooth; and
   the smart desk controller having a workplace fitness device proximity sensor, the smart desk controller establishing wireless connectivity with a nearest one of the more than one workspace fitness device as detected by the workplace fitness device proximity sensor.

2. The apparatus of claim 1, wherein the smart desk controller electronically identifies an individual using one of optically reading a barcode, wireless radio communication, or, by accepting manual input from a user.

3. The apparatus of claim 1, wherein the smart desk controller that identifies an individual, matches that individual's credentials to a data entry record in a remote server database.

4. The apparatus of claim 1, further comprising: a power distribution hub, wherein the power distribution hub has at least one AC outlet and one USB connector.

5. The apparatus of claim 4, wherein the USB connector faces down towards the direction where a desk drawer can be installed underneath the desktop, thus, facilitating a smart gadget to connect to the USB port while the smart gadget is stored in said drawer.

6. The apparatus of claim 1, wherein the workspace fitness device is one of a smart under-the-desk bike, a smart-stepper, a smart-elliptical, a smart-yoga-ball or a smart-balance-board.

7. The apparatus of claim 1, further comprising: one of a tampering sensor, proximity sensor, presence sensor or photovoltaic sensor, wherein, when armed, the sensor triggers an alarm in the smart desk controller, wherein the smart desk controller connects to the remote server and triggers an alarm alert, wherein the alarm alert is broadcasted via a smartphone application.

8. The apparatus of claim 1, further comprising: a built-in presence sensor, wherein that presence sensor determines the presence of someone seated, standing or moving in a predetermined area around the desktop.

9. A method to keep track of performance data while using standing desks or a fitness device comprising:
   providing a desk with a smart desk controller apparatus that installs inside a desktop surface, comprising: a built-in CPU on a motherboard with networking capabilities, a radio communication device, wherein the CPU connects to a remote server database, wherein the CPU has no external display, wherein the radio communication device is one from the group of a Near Field communication or NFC, RFID, Wi-Fi or Bluetooth, and the smart desk controller having a workplace fitness device proximity sensor;
   providing more than one workspace fitness device; and
   moving one workspace fitness device nearer to the desk than others of the more than one workplace fitness device, whereby the smart desk controller establishes wireless connectivity to the nearer one of the more than one workspace fitness device as detected by the workplace fitness device proximity sensor.

10. The method of claim 9, wherein the remote server comprises a database with a user's data, a user's preferences, and a user's performance data.

11. The method of claim 9, wherein the smart desk controller electronically identifies an individual using one of optically reading a barcode, wireless radio communication, or, by accepting manual input from a user.

12. The method of claim 9, wherein the smart desk controller that identifies an individual, matches that individual's credentials to a data entry record on the remote server database.

13. The method of claim 9, wherein the workspace fitness device is one of a smart under-the-desk bike, a smart-stepper, a smart-elliptical, a smart-yoga-ball, or a smart-balance-board.

14. The method of claim 9, further comprising: one of a tampering sensor, proximity sensor, presence sensor, or photovoltaic sensor, wherein, when armed, the sensor triggers an alarm in the smart desk controller, wherein the smart desk controller connects to the remote server and triggers an alarm alert, wherein the alarm alert is broadcasted via a smartphone application.

15. The method of claim 9, further comprising a built-in presence sensor, wherein that presence sensor determines the presence of someone seated, standing, or moving in a predetermined area around the desktop.

\* \* \* \* \*